United States Patent [19]

Boucher

[11] 4,105,259
[45] Aug. 8, 1978

[54] ENDLESS TRACK FOR A TRACKED VEHICLE

[76] Inventor: Rosaire Boucher, 78 St. Olaf Street, Sept-Iles, Canada, G4R 1R9

[21] Appl. No.: 791,038

[22] Filed: Apr. 26, 1977

[51] Int. Cl.² ............................................. B62D 55/20
[52] U.S. Cl. ........................................ 305/50; 46/219; 152/225 R; 305/56
[58] Field of Search ...................... 305/50, 53, 39, 56; 152/225 R, 225 C, 226–230; 46/219

[56] References Cited

FOREIGN PATENT DOCUMENTS 563,907  1/1958  Belgium .............................. 152/225 R
436,606  11/1926  Fed. Rep. of Germany ...... 152/225 R

*Primary Examiner*—Robert B. Reeves
*Assistant Examiner*—John P. Shannon

[57] ABSTRACT

An endless track concept particularly adapted for a tracked vehicle toy having no track tensioning means and wherein the track is characterized by its simple and economical construction, as required for a toy. This endless track includes a plurality of simply interconnected links, with each link being made solely of a length of wire bent into a generally U-shape configuration. Each link includes a transverse portion and opposite end portions, the transverse portion having a sinusoidal shape defining a wheel-engaging concave central portion, a pair of convex portions at opposite sides respectively of the concave central portion, first legs interconnecting said concave portion to the respective convex portions and serving as wheel guides, second legs outwardly spaced from the first legs and forming extensions of said convex portions, short pivot portions projecting endwise away from the outer ends of said second legs; respectively transversely of the track at substantially the level of said concave central portion, the end portions project from the intermediate portion generally longitudinally of the track and have each a hook engaging the corresponding short pivot portion of a next link. The first legs are sufficiently long to prevent the track from coming out of engagement with the wheel of the vehicle toy, even if there is no track tensioning means on the toy.

1 Claim, 3 Drawing Figures

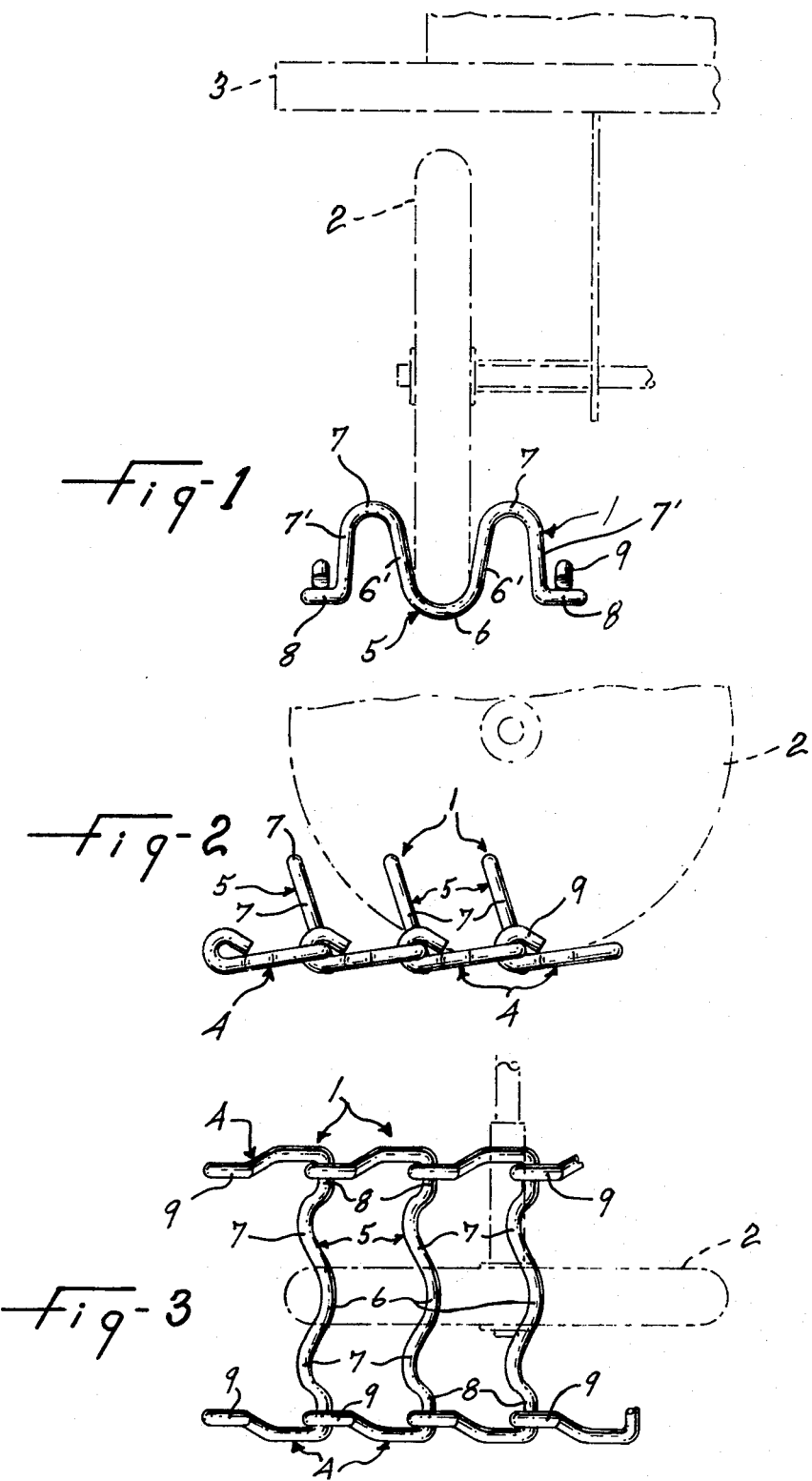

ENDLESS TRACK FOR A TRACKED VEHICLE

This invention relates to an endless track for a tracked vehicle and, more particularly, to an endless track for a tracked vehicle toy.

The known endless tracks for real tracked vehicles are of complex construction and involve a number of parts which cannot practically and economically be reproduced at the reduced scale required for a tracked vehicle toy.

It is a general object of the present invention to provide an endless track particularly adapted to be made for a tracked vehicle toy, and in particular, which is of simple and economical construction.

The endless track hereinafter defined in detail has each link made of a single length of wire which is bent to provide the necessary wheel guidance and link interconnection, to be economical to produce. This endless track concept well simulates a real endless track, and may be used on a toy vehicle having no track tensioning means.

The above and other objects and advantages of the present invention will be understood with reference to the following detailed description of a preferred embodiment thereof, which is illustrated, by way of example, in the accompanying drawings, in which:

FIG. 1 is an elevation view of a endless track link according to the present invention and as seen in the longitudinal direction and in the bottom run of the endless track;

FIG. 2 is a side view of a portion of endless track according to the present invention and with a wheel partly shown in dotted lines and in operative position with the portion of the track; and FIG. 3 is a plan view as seen from the top in FIG. 2.

The endless track according to the present invention includes a plurality of identical links 1 which are connected one to another to form an endless loop. This endless track is engaged in conventional manner around a row of wheels, such as wheel 2 shown in dotted lines. These wheels support the body of a vehicle partly shown at 3.

Each illustrated link 1 is made of a single length of wire which is bent into a generally U-shape configuration, as seen in top view, as in FIG. 3. Each link 1 includes opposite co-planar end portions 4 and an intermediate portion 5. The latter extends transversely of the endless track and is bent sinusoidally and lie in a plane which is nearly perpendicular to the plane containing end portions 4 to form a wheeltread-engaging concave central portion 6 and a pair of convex portions 7 at opposite sides respectively of the concave central portion. Portions 6 and 7 are interconnected by legs 6' which are slightly diverging in a direction away from central portion 6.

Legs 6' form wheel guides extending on each side of the wheels 2. The intermediate portion 5 of each link further includes a second pair of legs 7', each forming an extension of each convex portion 7 and in turn extended by a short outer pivot portion 8 longitudinally projecting transversely of the endless track at sustantially the level of concave central portion 6 and each between the corresponding leg 7' and end portion 4.

The two end portions 4 of each line 1 project endwise on one side and away from the afore-mentioned plane of the intermediate portion 5. Each end portion 4 projects endwise from the outer end of an outer end portion 8 nearly orthogonal to the common plane defined by the corresponding intermediate portion 5.

The end portions 4 of each link are bent transversely inward relative to the endless track from the outer ends of the corresponding intermediate portions 5. Each end portion 4 forms a hook 9 at its outer end, which, due to the bending of the end portions, engages or hooks on the corresponding outer end portion 8 of the next link 1.

The hooks 9 are thus laterally restrained each between the corresponding leg 7' and end portion 4 of the next link.

I claim:

1. An endless track for a tracked vehicle toy comprising a plurality of interconnected links, each consisting of a length of wire bent into a generally U-shaped configuration when seen in top plan view, defining opposite end portions and an intermediate portion, the latter extending transversely of the endless track and being bent into a sinusoidal configuration lying in a commmon plane nearly perpendicular to the plane containing said end portions, said sinusodial configuration defining a wheel tread engaging concave central portion and a pair of similar wheel guides extending on each side of a vehicle wheel and formed by slightly diverging first legs, each leg being extended by a convex portion in turn extended by a second leg outwardly spaced from the respective first legs and in turn extended by a short pivot portion, such short pivot portions being aligned transversely of the track and located at substantially the level of said concave central portion, said opposite end portions forming extensions of said short pivot portions and extending longitudinally of the track and forming a hook at the outer end thereof, the hooks of each link pivotally engaging the respective short pivot portions of a next link, the distance between said concave portion and each of said convex portions being equal to at least 0.6 times the distance between said end portions.

* * * * *